(12) United States Patent
De Buyst

(10) Patent No.: US 6,506,975 B2
(45) Date of Patent: Jan. 14, 2003

(54) CABLE JOINT WITH IMPROVED SCREEN CONNECTION

(75) Inventor: Jo De Buyst, Lede (BE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/962,139

(22) Filed: Sep. 26, 2001

(65) Prior Publication Data
US 2002/0040803 A1 Apr. 11, 2002

(30) Foreign Application Priority Data
Oct. 5, 2000 (EP) .............................. 00402751

(51) Int. Cl.⁷ ................................................ H01R 4/00
(52) U.S. Cl. ............................... 174/88 R; 174/DIG. 8; 174/88 C
(58) Field of Search ............................ 174/88 C, 88 R, 174/73.1, 84 R, DIG. 8

(56) References Cited

FOREIGN PATENT DOCUMENTS

| | | |
|---|---|---|
| EP | 0 272 131 A2 | 6/1988 |
| EP | 0 549 942 A2 | 7/1993 |
| FR | 2 551 927 A1 | 3/1985 |
| WO | WO 99/62156 | 12/1999 |
| WO | WO 00/01048 | 1/2000 |

*Primary Examiner*—Chau N. Nguyen
(74) *Attorney, Agent, or Firm*—Sughrue Mion, PLLC

(57) ABSTRACT

A cable joint for high voltage electric power cables (10, 20) and with an improved smooth screen connection is provided. This cable joint is formed by first applying a cold shrinkable insulating joint-body (5) over a semiconductive plate covering a junction connector and ends of the semi-conductive screens (13, 23) of the cable. A copper mesh (9) is then provided over this insulating joint-body. Ends of the wires of the wired-screens (12, 22) of the cables are bent back over the copper mesh and spread so as to cover the whole circumference thereof. A copper plate (30) is then rolled around the joint, covering the conductive wires of the wired-screens. Finally, a cold shrinkable insulating joint-cover (3) is applied over the joint, covering and exerting a permanent pressure onto the conductive plate (30) over the wires of the wired-screens (12, 22). Because the wire are equally distributed over the perimeter of the copper mesh, the joint has a smooth design with a constant diameter. Additionally, because of the symmetrical cylindrical pressure on underlying insulating mastic, the latter is prevented to flow away in any direction preventing so the risk of partial discharges and product failure.

12 Claims, 3 Drawing Sheets

CABLE JOINT WITH IMPROVED SCREEN CONNECTION

BACKGROUND OF THE INVENTION

The present invention relates to a cable joint between two relatively high voltage electric power cables, each cable having a conductor surrounded by, successively, a core insulation, a semi-conductive screen, a wired-screen and an outer cable sheath, said cable joint comprising, successively from an innermost to an outer side:

a junction connector adapted for connecting together bared ends of said conductors;

a semi-conductive layer adapted for covering said junction connector and ends of said core insulations, but separated from the semi-conductive screens of the two cables;

an insulating layer adapted for covering said semi-conductive layer and bared ends of said core insulations;

a conductive layer adapted for covering said insulating layer;

bared ends of conductive wires of said wired-screens; and an insulating joint-cover adapted for covering said cable joint including ends of the outer cable sheaths of the two cables.

Such a cable joint is already known in the art, e.g. from the European Patent Application EP-A2-0 272 131 "HV cables" of RAYCHEM GmbH, first filed on Dec. 12, 1986 (GB 8630335). Therein, a conductive layer is positioned on top of a stress-controlling layer so as to provide a Faraday cage around the connector. Additionally to this conductive layer forming an electromagnetic protection, the bared ends of the screen or earth wires are formed into a pigtail, brought together over the joint and interconnected by a crimp connector. The joint is further enclosed within an outermost heat shrinkable tube of insulating material forming the joint-cover recovering the outer jacket of each of the cables.

In such a known cable joint, the relatively large diameter of the screen wires arranged in pigtails and more particularly of the crimp connector interconnecting them is located over the joint connector. This provides locally a larger radius of the cable joint, i.e. a bump. As a consequence, when the heat shrinkable tube is applied onto the joint, it exerts thereon a pressure that is locally higher over the bump. The underlying layers are then over-compressed by the bump with the risk of damaging them and of also damaging the joint-cover, e.g. but cutting. The bump is even more detrimental in case of a joint containing mastic inside. Mastic is generally used in a cable-joint as insulating or filed controlling material and may for instance be applied below the insulating layer. A problem with a heat shrinkable tube is that the extra pressure caused by the bump would make the mastic to flow away.

A possible solution to avoid this problem is to locate the screen interconnection, i.e. the crimp connector, at an extremity of the joint. However, the screen wires arranged in a pigtail and running over the joint then still form a longitudinal bump. Additionally, the length of the whole joint will be increased, with all the drawbacks thereof: cost, accessibility, . . .

SUMMARY OF THE INVENTION

An object of the present invention is to provide a cable joint of the above known type but with a smooth wired-screen connection, while remaining relatively cheap and simple, and reducing as much as possible the length of the outer joint-cover.

According to the invention, this object is achieved due to the fact that the bared ends of said conductive wires are substantially equally distributed over the circumference of the underlying conductive layer, that a conductive metal plate adapted for covering the ends of said conductive wires is provided between said conductive layer and said joint-cover, and that said joint-cover is made of retracted cold shrinkable insulating material.

In this way, an asymmetrical connection is avoided because there is no longer a crimp connector lying on the joint. The diameter of the joint is maintained constant owing the distribution of the screen wires all over it. Moreover, a good electrical contact is ensured between the screen wires of the two cables via the conductive metal plate that is continuously pressed thereon by the shrinked or retracted cold shrinkable joint-cover. Furthermore, since the screen connection is located over the joint connector, the length of the joint, and more particularly of its outer joint-cover or protective sleeve remain relatively short.

It is to be noted that the joint-cover disclosed in the above-mentioned European Patent Application is a heat shrinkable joint-cover, which is thus positioned by heating. Once the heating is removed, the joint-cover remains in place but, contrarily to the present cold shrinkable joint-cover, a pressure is then no longer exerted on the underlying layers of the joint. The cold shrinkable joint-cover maintains a pressure on the underlying layers of the joint for ever and this maintains a good electric contact between the conductive metal plate and the underlying conductive wires. This permanent pressure is further cylindrically distributed in a symmetrical way so that the underlying insulating or field controlling mastic is equally spread over the joint. Another advantageous effect of this symmetrical pressure is that the mastic is prevented to flow away in any particular direction. This avoids the creation of gaps with a resulting risk of partial discharges and product failure.

It is also to be noted that the French Patent Application FR-2 551 927 "Dispositif de blindage électromagnétique de jonction" of the SOCIETE DES ETABLISSEMENTS JACQUES DUBOIS & Cie—FR, filed on Sep. 8, 1983, also discloses a cable joint. However, this other known cable joint relates to low voltage cables adapted to transmit electronic signals such as telecommunication (PTT) signals. Although this known document discloses a sleeve of braided wires interconnecting the wired-screens of the cables, the purpose of the sleeve is to ensure the continuity of the electromagnetic shielding of the cables. The known sleeve is thus not adapted to allow relatively high currents to flow therethrough and the cables are further not provided with all the above mentioned layers. These cables are thus not adapted to withstand the above-mentioned relatively high voltage.

The two known documents relate to electromagnetic shielding of cables and not to screen interconnection as it is the subject of the present invention. However, applying the knowledge of this low voltage joint to the above known high voltage joint will not lead to the present invention. Indeed, none of the known documents teaches the use of a cold shrinkable joint-cover adapted to exert a permanent pressure onto the conductive metal plate for maintaining a good electric contact between this plate and the underlying conductive wires.

The European Patent EP-B1-0 549 942 entitled "Electrical cable junction, premounted junction, assembly and manufacturing process" of EUROMOLD (BE), first filed on Dec. 17, 1991 (FR 19910015666) also discloses a conductive metal plate that is a screen tap mounted on the bared ends of the semi-conductive screens of the cables. This known screen tap is of a relatively complex design and is thereby relatively expensive. It further requires a special tool to fix the screen tap onto the semi-conductive screen of the cable. Therefore, using the teaching of such a screen tap to apply it to the present improvement of a screen connection will result in making the latter complex and expensive and it thus against the object of the present invention.

The present invention also relates to a method of forming a joint between two relatively high voltage electric power cables.

Such a method is well known in the art and is for instance disclosed in the above mentioned European Patent Application EP-A2-0 272 131. Additionally to the known problems associated to a cable joint realized according to the known method and mentioned above, it is to be noted that the method disclosed in this European Patent Application further requires the use of a special crimping tool. This crimping tool is necessary to realize the interconnection of the bared ends of the screen or earth wires that have each to be arranged in a pigtail. The use of the crimping tool delays the creation of the joint and is not easy to manipulate in the field.

A further object of the present invention is to provide a method of forming a cable joint relatively faster as with the known method and with and improved or smoother wired-screen connection, while remaining relatively heap in production cost.

According to the invention, this further object is achieved due to the act that, in the present method:

a joint-body assembly comprising a cold shrinkable joint-body expanded on a first support tube, is slid over a first of said cables, a joint-cover assembly comprising a cold shrinkable joint-cover expanded on a second support tube, is slid over the second of said cables, and, for each cable:

an outer cable sheath is removed to expose an underlying wired-screen, conductive wires of said wired-screens are bend back over said outer cable sheath to expose an underlying semi-conductive screen, said semi-conductive screen is removed to expose a core insulation, and said core insulation is removed to expose a bared conductor, then:

said bared conductors are connected together by means of a junction connector, said junction connector and, partially, said core insulations are covered with a semi-conductive layer, separated from said core insulation,- said joint-body assembly is slid over said semi-conductive layer and bared ends of said core insulations, and said first support tube is removed, the shrinked joint-body is covered with a conductive layer, said conductive wires are bend back over said conductive layer so as to cover substantially the whole surface of said conductive layer, said conductive wires, distributed over the circumference of said conductive layer, are at least partially covered with a conductive metal plate, and said joint-cover assembly is slid over said conductive metal plate so as to cover ends of the outer cable sheath of the two cables, and said second support tube is removed so that the cable joint, including the ends of the outer cable sheath of the two cables, is covered by the shrinked joint-body.

By distributing the conductive wires of the wired-screens, or screen wires, over the circumference or surface of the conductive layer and by covering them with a conductive plate, a smooth wired-screen connection is obtained. This leads to a symmetrical connection with a constant external diameter. Furthermore, a good electrical contact is ensured by the conductive metal plate that is continuously pressed on the screen wires of the two cables owing to the permanent pressure exerted by the retracted cold shrinkable joint-cover. This permanent pressure is further cylindrically distributed in a symmetrical way.

Because of the conductive metal plate is not covering more than the screen wires over the conductive layer, and is thus located over the joint, the length of the outer joint-cover or protective sleeve also remains relatively short.

Furthermore, no tool is required to bend back the screen wires, nor to place the conductive metal plate over these screen wires. This facilitates and increases the speed of creation of the joint in the field.

Another characterizing embodiment of the present method is that said cold shrinkable joint-body comprises a layer of insulating material and an inner layer of mastic.

In this way, and because the permanent pressure exerted by the retracted cold shrinkable joint-cover is cylindrically distributed in a symmetrical way, the underlying mastic is equally spread over the joint. As a result, the mastic, being insulating or field controlling, is prevented to flow away thus leaving, at particular locations, a gap with a resulting risk of partial discharges and product failure.

Another characterizing embodiment of the present method is that said conductive metal plate is rolled around the joint, covering the conductive wires of said wired-screens.

The metal plate is thus easily positioned and the sliding of the cold shrinkable joint-cover over this metal plate is facilitated.

Further characterizing embodiments of the present cable joint with the improved screen connection and of the method for obtaining such a cable joint are mentioned in the appended claims.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

The different steps for realizing a joint between two high voltage electric power cables 10 and 20, according to the present invention, will be explained below.

Figure 1:
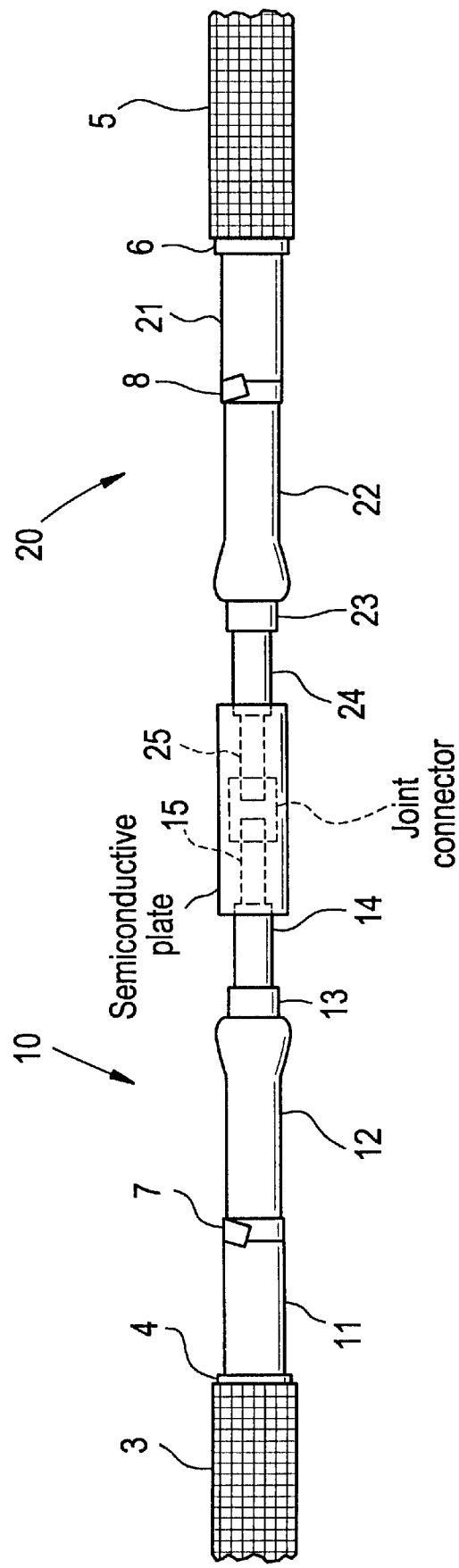
FIG. 1 represents two cables 10, 20 ready to be interconnected by means of a cable joint according to the invention.

Facing ends of the cables 10 and 20 to be interconnected are first prepared as represented at FIG. 1. The ends of the cables are trained and straighten in their final position as shown. The cables are then cleaned over approximately 1 meter. At the center of the joint, the cables are cut squarely so that their ends will touch.

On the one hand, an insulating joint-cover assembly made of a cold shrinkable joint-cover 3 expanded on a plastic support tube 4, is slid over the cable 10. On the other hand, an insulating joint-body assembly made of a cold shrinkable joint-body 5 expanded on another plastic support tube 6, is slid over the second cable 20.

The over-sheaths or outer cable sheaths 11, 21 are then removed to expose underlying wired-screens 12, 22 of the cables 10, 20 respectively. The wired-screens 12, 22 are composed of copper wires that are bend back over the outer cable sheaths 11, 21 in order to expose ends of underlying extruded semi-conductive screens 13, 23. The copper wires 12, 22 are straightened and their ends are secured on the outer cable sheaths 11, 21 with wraps of tape such as 7 and 8 respectively.

On each cable 10, 20, the extruded semi-conductive screen 13, 23 is removed to expose an underlying core insulation 14, 24. The cable preparation is completed by removing the core insulation 14, 24 to expose the bared conductor 15, 25 of each cable.

These bared conductors 15, 25 are then connected together by means of a junction barrel or joint connector, that is for instance a well known crimp connector. Sealing mastic may be used to fill up the gaps between the core insulations and both ends of the joint connector.

Figure 2:
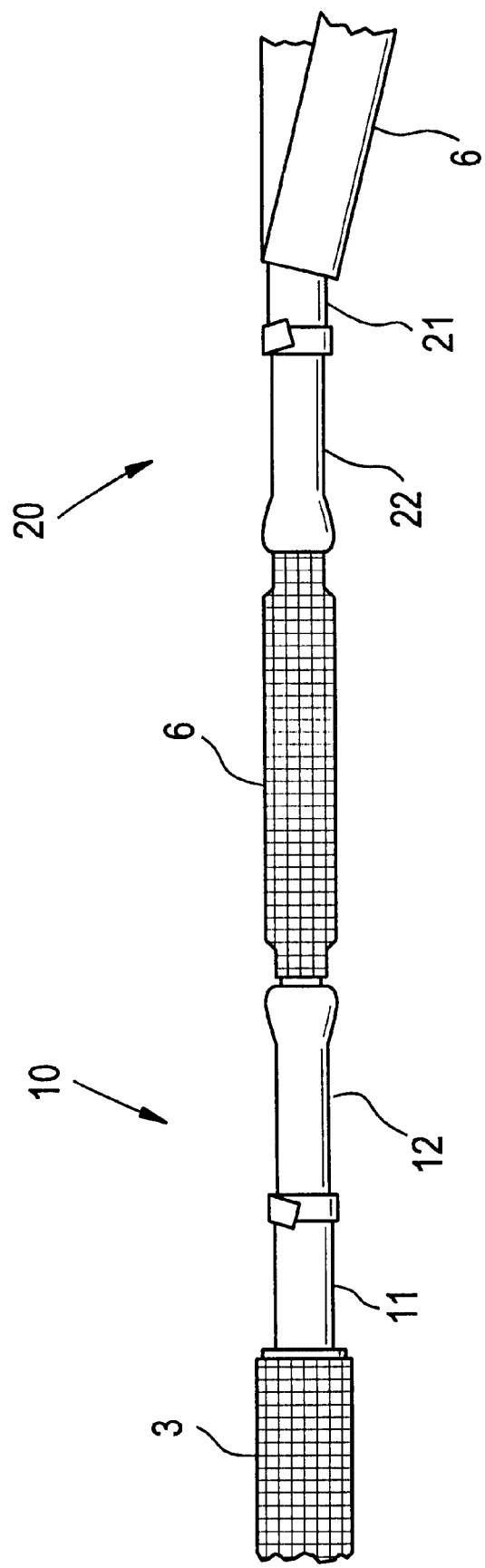
FIG. 2 shows an intermediate connection step where the joint is covered with a retracted cold shrinkable joint-body 5, the screen wires 12, 22 being bent back over the outer cable sheaths 11, 21.

A semi-conductive plate, preferably larger than the joint connector and thus partially covering the bared ends of the core insulations of the two cables, is then centered on and fold around the joint connector. This semi-conductive plate or layer is separated from the semi-conductive screens 13, 23 of the cables, i.e. has no contact therewith. The joint-body assembly with the expanded joint-body 5 is then slid over the semi-conductive plate until it comes flush with the end of the outer cable sheath 11 of cable 10, i.e. against the bending point of the screen wires 12. The plastic support tube 6 is pulled out from the joint-body assembly so that the joint-body front end falls off its support tube 6, and so further until the joint-body 5 covers the joint between the bent screen wires 12 and 22, as shown at FIG. 2. The support tube 6 is then removed from the joint.

The joint-body 5 comprises at least an insulating layer that is generally a rubber insulation. Additionally, the joint-body 5 may comprise an underlying layer of mastic. This mastic, that is insulating and/or field controlling mastic, is preferably provided on the joint-body rather than being added manually to the joint prior to the positioning of this joint-body. The reason therefore is that, being on the joint-body, the mastic will be exactly positioned on the joint at locations where it needs to be, without any additional operation. Furthermore, the joint-body 5 may also be provided with an external semiconductive layer.

Figure 3:
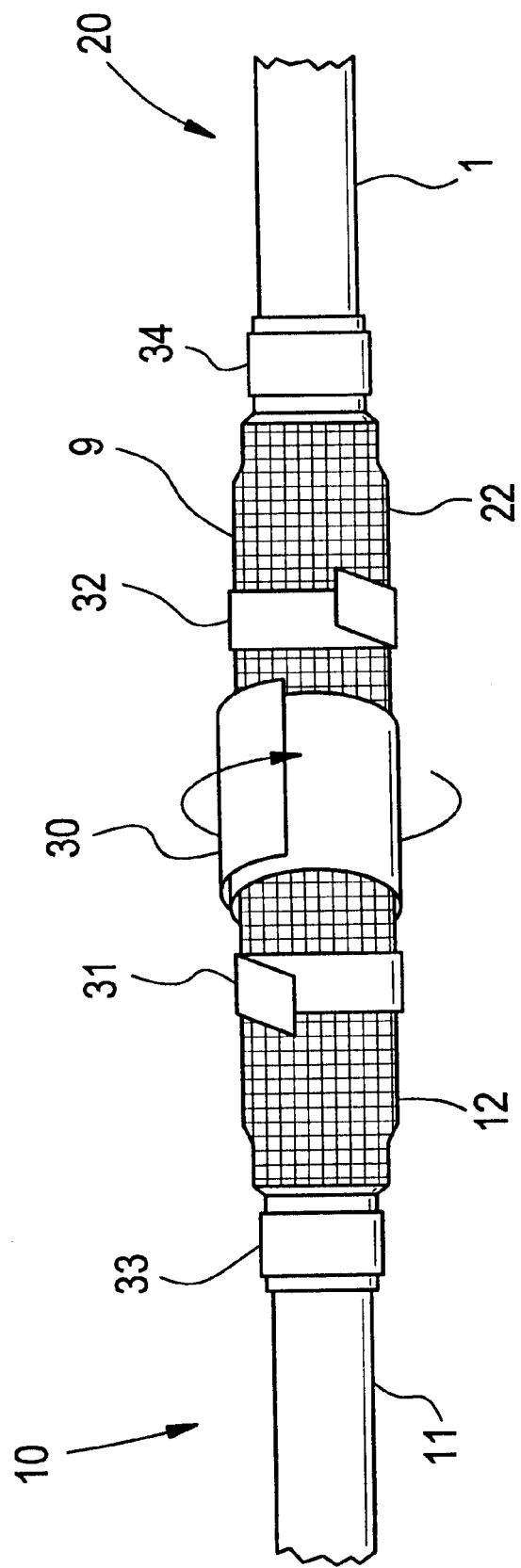
FIG. 3 shows a further intermediate connection step where the screen wires 12, 22 of the cables 10, 20 are bent back all over a conductive layer 9 and are partially covered with a plate of copper 30.

As shown at FIG. 3, a copper mesh 9 is wrapped over the joint-body 5. This conductive layer 9 flush with both ends of the joint-body 5, i.e. between the bent screen wires 12 and 22 of FIG. 2. The copper screen wires 12 and 22 are then bent back over each end of the copper mesh 9 so as to be equally spread around the perimeter of this conductive layer. The copper wires 12, 22, which are too short to touch each other, are then secured on the mesh 9 with a wrap of PVC tape 31, 32, respectively.

A thin copper plate 30, of about 0.2 to 1 mm thick and 50 mm wide, is rolled around the copper wires 12, 22 of the wired-screens, covering at least partially these wires from both sides. Care is taken to keep the PVC tape 31, 32 outside the contact surface between the conductive metal plate 30 and the conductive wires 12 and 22. The plate 30 may be fixed with an adhesive tape and all the bared metal is covered with a wrap of PVC tape (not shown).

In order to smooth even more the joint, sealing mastic 33, 34 may be applied around the cable over-sheath 11, 21 against the copper wires 12, 22.

Finally, the assembly with the cold shrinkable joint-cover 3 expanded on its support tube 4 is slid over the conductive metal plate 30 and the screen wires 12 and 22 until it covers the ends of the outer cable sheath 11, 21 of the two cables 10 and 20 respectively. The support tube 4 is then removed by first pulling it out from the joint-cover assembly so that the joint-cover front end falls from the outer cable sheath 11 to the outer cable sheath 21 and covers so the whole joint.

While the principles of the invention have been described above in connection with specific apparatus, it is to be clearly understood that this description is made only by way of example and not as a limitation on the scope of the invention, as defined in the appended claims.

What is claimed is:

1. A cable joint between two relatively high voltage electric power cables (10, 20), each cable having a conductor (15, 25) surrounded by, successively, a core insulation (14, 24), a semi-conductor screen (13, 23), a wired-screen (12, 22) and an outer cable sheath (11, 21), said cable joint comprising, successively from an innermost to an outer side:
  a junction connector adapted for connecting together bared ends of said conductors;
  a semi-conductive layer adapted for covering said junction connector and ends of said core insulations, but separated from the semi-conductive screens of the two cables;
  an insulating layer adapted for covering said semi-conductive layer and bared ends of said core insulations;
  a conductive layer (9) adapted for covering said insulating layer;
  bared ends of conductive wire of said wired-screens; and
  an insulating joint cover (3) adapted for covering said cable joint including ends of the outer cable sheaths of the two cables, characterized in that
  the bared ends of said conductive wires (12, 22) are substantially equally distributed over the circumference of the conductive layer (9),
  a conductive metal plate (30) adapted for covering the ends of said conductive wires is provided between said conductive layer and said joint-cover (3), and
  said joint-cover is made of retracted cold shrinkable insulating material.

2. The cable joint according to claim 1, characterized in that said conductive metal plate (30) is a plate of copper.

3. The cable joint according to claim 1, characterized in that said conductive layer (9) covering said insulating layer (5) is a copper mesh.

4. A method of forming a joint between two relatively high voltage electric power cable (10, 20),
  wherein,
    a joint-body assembly comprising a cold shrinkable joint-body (5) expanded on a first support tube (6), is slid over a first (20) of said cables, a joint-cover assembly comprising a cold shrinkable joint-cover (3) expanded on a second support tube (4), is slid over the second (10) of said cables, wherein, for each cable, an outer cable sheath (11, 21) is removed to expose an underlying wired-screen (12, 22), conductive wires of said wired-screens are bend back over said outer cable sheath to expose an underlying semi-conductive screen (13, 23), said semi-conductive screen is removed to expose a bared conductor (15, 25), and wherein said bared conductors are connected together by means of a junction connector, said junction connector and, partially, said core insulations are covered with a semi-conductive layer, separated from said core insulation (14, 24), said joint-body assembly is slid over said semi-conductive layer and bared ends of said core insulations, and said first support tube (6) is removed, the joint-body (5) after shrinking is covered with a conductive layer (9), said conductive wires are bend back over said conductive layer so as to cover substantially the whole surface of said conductive layer, said conductive wires, distributed over the circumference of said conductive layer, are at least partially covered with a conductive metal plate (30), and said joint-cover assembly is slid over said conductive metal plate so as to cover ends of the outer cable sheath of the two cables, and said second support tube (4) is removed so that the cable joint, including the ends of the outer cable sheath of the two cables, is covered by the shrunken joint-body (5).

5. The method according to claim 4, wherein said cold shrinkable joint-body (5) comprises a layer of insulating material.

6. The method according to claim 4, wherein said cold shrinkable joint-body (5) comprises a layer of insulating material and an inner layer of mastic.

7. The method according to claim 5, wherein said cold shrinkable joint-body (5) comprises a layer of insulating material and an outer layer of semi-conductive material.

8. The method according to claim 4, wherein said conductive metal plate (30) is rolled around the joint, covering the conductive wires of said wired-screens (12, 22).

9. The method according to claim 8, wherein said conductive metal plate (30) is made of copper.

10. The method according to claim 8, wherein said conductive metal plate (30) and the conductive wires of said wired-screens (12, 22) are covered with adhesive tape.

11. The method according to claim 4, wherein said conductive layer (9) covering the shrunken joint-body (5) is a copper mesh.

12. The method according to claim 4, wherein said cold shrinkable joint-cover (3) is made of insulating material.

\* \* \* \* \*